United States Patent [19]
DeVore et al.

[11] Patent Number: 5,915,811
[45] Date of Patent: Jun. 29, 1999

[54] SOLAR DRYING PROCESS AND APPARATUS

[75] Inventors: Jack B DeVore, Fayetteville; James E. Snow, Gentry, both of Ark.

[73] Assignee: The Board of Trustees of the University of Arkansas, Little Rock, Ark.

[21] Appl. No.: 08/941,579

[22] Filed: Sep. 30, 1997

Related U.S. Application Data

[60] Provisional application No. 60/027,197, Sep. 30, 1996.

[51] Int. Cl.⁶ .................................................. F26B 19/00
[52] U.S. Cl. ............................. 34/93; 34/212; 34/215; 34/219
[58] Field of Search ........................ 34/77, 86, 93, 34/511, 512, 202, 210, 212, 215, 219; 165/45, 48.1; 126/591, 595

[56] References Cited

U.S. PATENT DOCUMENTS

| | | | |
|---|---|---|---|
| 4,106,215 | 8/1978 | Rosen | 34/217 |
| 4,258,697 | 3/1981 | Flagg | 126/430 |
| 4,432,147 | 2/1984 | Chen et al. | 34/46 |
| 4,831,747 | 5/1989 | Roos et al. | 34/54 |
| 4,862,599 | 9/1989 | Brunner | 34/46 |
| 4,893,415 | 1/1990 | Moldrup | 34/77 X |
| 5,325,604 | 7/1994 | Little | 34/493 |
| 5,343,632 | 9/1994 | Dinh | 34/77 X |
| 5,595,000 | 1/1997 | Goodwin, III | 34/77 X |

OTHER PUBLICATIONS

William T. Simpson, et al, "Solar Dry Kiln for Tropical Latitudes", *Forest Products Journal*, vol.. 34, No. 5, pp. 25–34, Apr. 1983.

*Primary Examiner*—Henry Bennett
*Assistant Examiner*—Steve Gravini
*Attorney, Agent, or Firm*—J.M. Mark Gilbreth; Robert W. Strozier; Gilbreth & Strozier, P.C.

[57] ABSTRACT

A drier with a curvalinear chamber having a heat transfer surface at one end and baffles at the other end. A fan is provided to circulate air within the chamber. In the process for drying, the product to be dried is positioned within the chamber and air circulated across the heat transfer surface, toward the baffle, past the product, and back to the heat transfer surface.

4 Claims, 2 Drawing Sheets

SOLAR DRYING PROCESS AND APPARATUS

RELATED APPLICATION DATA

This application claims priority from U.S. Provisional application Ser. No. 60/027,197 filed on Sep. 30, 1996.

BACKGROUND OF THE INVENTION

1. Field of the Invention

The present invention relates to methods of and apparatus for drying. In another aspect, the present invention relates to methods of and apparatus for drying wood, to solar collectors, and to wood products. In even another aspect, the present invention relates to methods of and apparatus for solar drying of wood, to curvalinear solar collectors, and to dried wood products.

2. Description of the Related Art

Lumber is a necessary commodity in our society and is obtained from timber only after much processing. Historically, in order to get the timber from the forest to the consumer, the timber industry has had to deal with three separate operations that are sometimes miles apart, the logging operation, the sawing operation and the drying operation.

By its very nature, logging typically occurs in remote, hard to access areas, making it difficult to transport cut lumber away from the logging operation. Since early saw mills were big and cumbersome, not easily moved from place to place, and required large capital investment, a compromise location was selected in order to economically accommodate logging operations from more than one location.

Many years ago, the drying operation only required a large area to air dry, or season, the lumber. Later, kiln dryers were used, but these had to be physically connected to a power source of some type, the availability of the power source governing the placement of the kilns.

Moving the lumber from one operation to another has always been a problem. Early sawmills were situated on water ways. These water way locations were critical to the timber industry as the most practical way to transport newly cut timber to sawing operations, and to power the saws necessary for the sawing operation.

Through the years, with the invention of the gasoline engine, the discovery of electricity, the establishment of railways and many more inventions and discoveries, the timber industry gained the necessary resources to begin refining their operations. Sawmills became more portable and could be located in close proximity to the actual logging operations.

With the advent of wood drying kilns, cut lumber could be more quickly and more suitably dried for consumer use.

Generally in the kiln drying process for lumber, hot air is blown across sawn unseasoned lumber to remove water. The lumber is arranged in stacks with small spacers, commonly referred to as stickers, between each layer so that the hot air is distributed across the faces of the lumber. After passing through the stack of lumber, the hot humid air is either partially vented, or dehumidified, to remove the water vapor before being reheated and recycled though the stacked lumber.

Two common methods of kiln drying are distinguished by the method used for heating and removing of water vapor.

In the first method, standard kiln drying, heat is supplied to the kiln directly, by burning of fossil fuel or indirectly, with steam passing through heat exchangers associated with the kiln. Water vapor is removed from the kiln by venting a portion of the recycled humid air to the atmosphere. Unfortunately, in standard kiln drying water evaporation is energy intensive, and such a kiln requires steam spray for stress relief of lumber at the end of drying which also adds to the energy requirements.

In the second method, dehumidification kiln drying, heat is electrically supplied to the kiln initially by a resistance heater and then with a condenser. Water vapor is condensed and removed from the kiln as water. Dehumidification drying has many drawbacks: (1) the drying process is slow taking twice as long as standard kiln drying; (2) the kiln operates at temperatures below 120° F. because of limitations in the dehumidification equipment; (3) drying rates below 10% moisture are extremely slow and moisture contents of 6% required for furniture-grade lumber cannot normally be achieved; and (4) no capabilities for a humidification period following drying of the lumber required to relieve internal stresses which remain in the lumber are available.

Prior art patents and articles include the following. "Solar dry kiln for tropical latitudes", William T. Simpson et al., Forest Products Journal, Vol. 34, No. 5, pp. 25–34, discloses a solar dry kiln having an insulated drying compartment attached to a horizontal external solar collector.

U.S. Pat. No. 4,432,147, issued Feb. 21, 1984 to Chen et al., discloses an energy efficient kiln using solar collectors and a refrigeration system that is useful for drying green lumber. Circulating air is heated by solar collectors and then by a condenser of a refrigeration system, passed in contact with lumber, and dehumidified by cooling across the evaporator of the refrigeration system before being reheated to start another cycle.

U.S. Pat. No. 4,831,747, issued May 23, 1989 to Roos et al., discloses a continuous drier for veneer. Temperature sensors and an infrared detector provide the veneer surface temperature to allow for determination of residual moisture of the veneer. The signal from the infrared detector is utilized in the control of blowers in the drying zones near the exit to provide more precise and reliable control in final moisture, allowing for better toleration of variations in dryer load, initial moisture, wood density, and sheet thickness.

U.S. Pat. No. 4,862,599, issued Sep. 5, 1989 to Brunner, discloses a process and apparatus for drying wood. The apparatus includes sensors for measuring wood moisture level and/or the velocity of the air to control air flow to achieve a desired air velocity profile in the plane of admission into a stack of wood to be dried.

U.S. Pat. No. 5,325,604, issued Jul. 5, 1994 to Little, discloses an automatic control system for a wood drying kiln, in which the weight of a representative sample positioned remote from the batch of wood to be dried is monitored to provide its moisture content. This moisture content is utilized to automatically adjust operational parameters within the kiln to provide desired drying conditions for the batch of wood.

To be of commercial value, wood must generally have a stability content and a moisture content of less than 9%, while kiln drying is the general approach utilized to achieve such moisture content, it is an energy expensive process.

Thus, in spite of these advancements in the prior art, there is still the need for improvement in apparatus for and process of drying timber.

Thus, there is another need for an apparatus for and process of drying timber that is energy efficient.

There is even another need in the art for an apparatus for and process of drying timber that is economically efficient.

There is still another need in the art for an apparatus and process of transporting a product while drying it.

There is yet another need in the art for an improved solar panel.

These and other needs in the art will become apparent to those of skill in the art upon review of this specification, including its drawings and claims.

SUMMARY OF THE INVENTION

It is an object of the present invention to provide for improved apparatus for and process of drying timber.

It is another object of the present invention to provide for an apparatus for and process of drying timber that is energy efficient.

It is even another object of the present invention to provide for an apparatus for and process of drying timber that is economically efficient.

It is still another object of the present invention to provide for an apparatus for and process of drying a product during its transportation.

It is yet another object of the present invention to provide for an improved solar panel.

These and other objects of the present invention will become apparent to those of skill in the art upon review of this specification, including its drawings and claims.

According to one embodiment of the present invention there is provided an apparatus for drying. The apparatus includes a chamber suitable for holding the item to be dried. The interior of the chamber generally includes curvalinear surfaces for facilitating air circulation, and further includes a warm end with a heat transfer surface and a cool end. A solar collector is positioned to provide heat to the heat transfer surface, with a fan positioned to provide air flow across the heat transfer surface. At the cold end is positioned a baffle to receive air flow from the heat transfer surface and direct it toward the warm end. In a further embodiment of this embodiment, the heat transfer surface is provided by the solar collector which is parabolic. In an even further embodiment of this embodiment, the fan is powered by a photo voltaic cell.

According to another embodiment of the present invention there is provided a method of drying a product. The method includes positioning the product within a chamber comprising curvalinear interior surfaces for facilitating air circulation, a heat transfer surface at one end of the chamber and a baffle at the other end of the chamber. The method further includes circulating air within the chamber across the heat transfer surface, toward the baffle, past the product, to dry the product.

According to even another embodiment of the present invention, there is provided a method of drying a product while transporting it from a first to a second point. The method includes positioning the product within a chamber comprising curvalinear interior surfaces for facilitating air circulation, a heat transfer surface at one end of the chamber and a baffle at the other end of the chamber. The method further includes circulating air within the chamber across the heat transfer surface, toward the baffle, past the product, to dry the product. The method additionally includes transporting the chamber from the first to second point during the drying step.

According to still another embodiment of the present invention, there is provided a solar panel having a convex portion which is oriented toward the sun during operation. Preferably, the solar panel further includes a concave portion which is oriented away from the sun during operation. Most preferably, the solar panel comprises a parabolic shaped cross-section.

DETAILED DESCRIPTION OF THE INVENTION

The present invention will now be discussed by reference to FIGS. 1–3.

Figure 1:
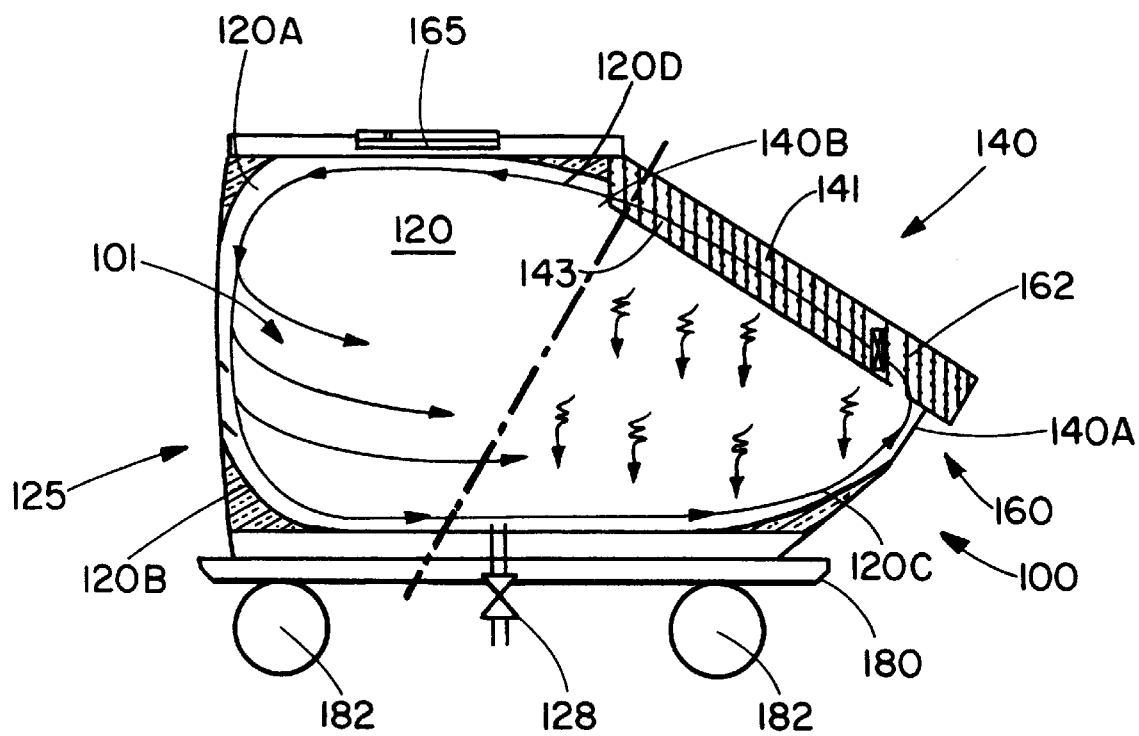
FIG. 1 is a cross-sectional cutaway view of one embodiment of the present invention showing kiln 100, including chamber 120, heating system 140, circulation system 160, and support carriage 180.
Figure 2:
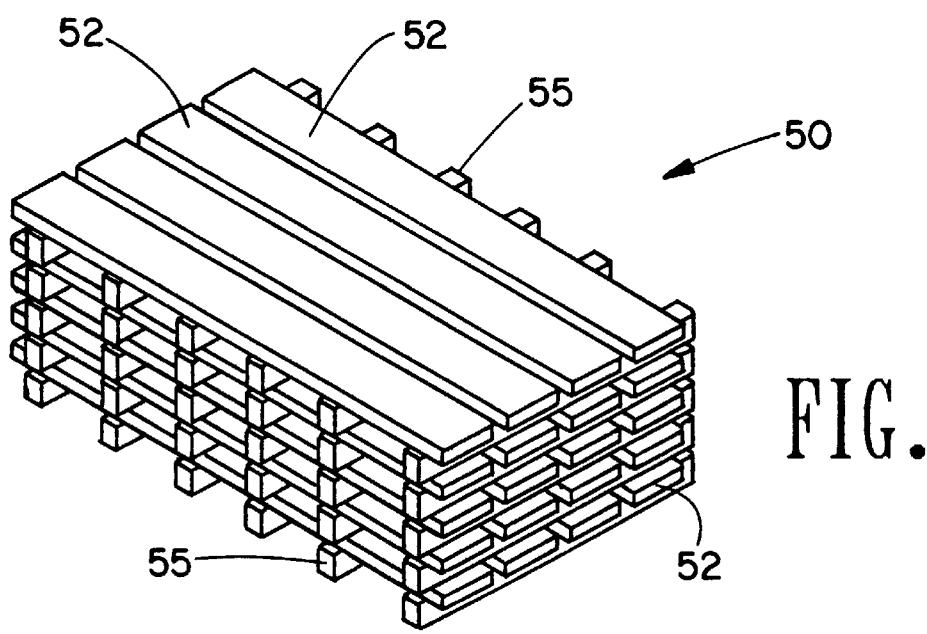
FIG. 2 is an illustration showing a stack of lumber 50, having individual boards 52, and stickers 55 to allow air flow between boards 52
Figure 3:
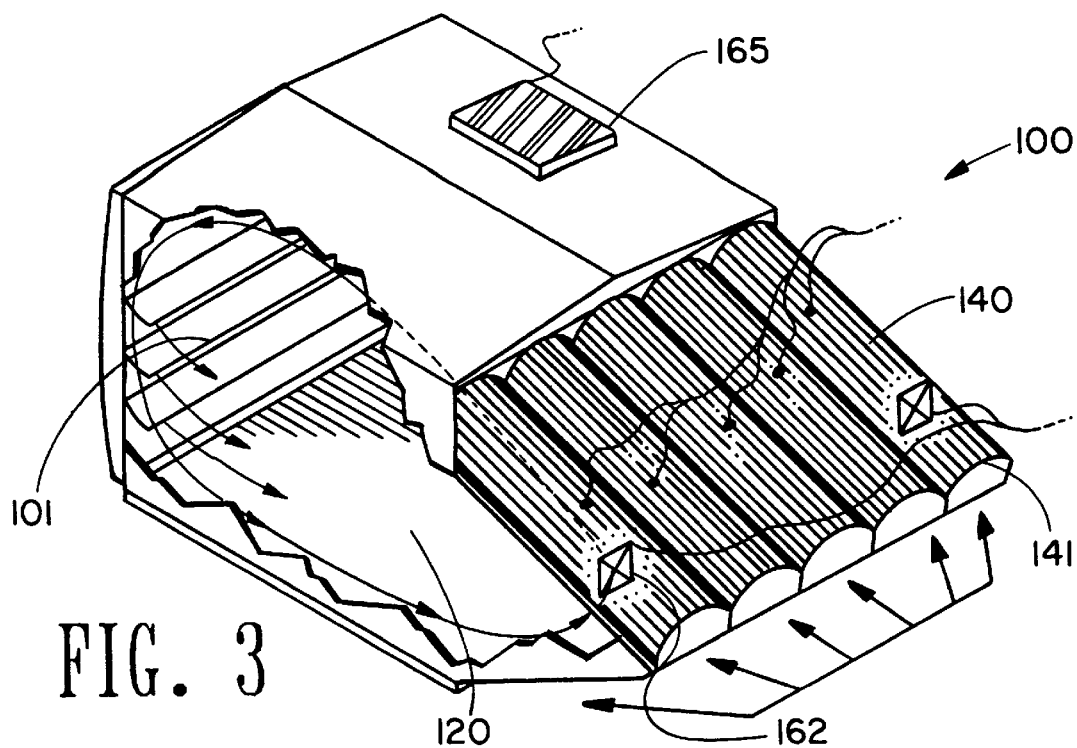
FIG. 3 is an isometric partial cutaway view of on embodiment of the present invention showing kiln 100, including chamber 120, heating system 140, circulation system 160.

Referring first to FIG. 1, a cross-sectional cutaway view of kiln 100 of the present invention, and additionally to FIG. 3, an isometric partial cutaway view of the kiln 100 of the present invention, there is shown one embodiment of the present invention showing kiln 100, including chamber 120, heating system 140, circulation system 160, and support carriage 180.

Chamber 120 is sized to hold a desired amount of raw lumber to be processed. Referring now to FIG. 2, there is shown a stack of lumber 50, showing individual boards 52, and stickers 55 to allow air flow between boards 52. This stack of lumber 50 is positioned within wood chamber 120.

Heating system 140 may comprise any suitable means for heating the circulating air 101 within chamber 120, including gas or electric powered heating systems. Preferably, heating system 140 includes one or more solar collectors 141 to provide solar heat to circulating air 101 circulating within wood chamber 120. While solar collectors 141 may be of any suitable shape, it is preferred that solar collectors 141 be somewhat elongated with a parabolic surface facing the sun as shown.

The solar collectors 141 utilized in the present invention may be of any suitable geometric configuration. Generally, solar collectors 141 will have a convex portion 141A which is oriented toward the sun during operation. Preferably, the solar panel further includes a concave portion 141B which is oriented away from the sun during operation. Most preferably, the solar panel comprises a parabolic shaped cross-section.

For internal circulation of air, it is desired that the rising warmer air rise at one end of the kiln and the falling cooler air fall at the other end of the kiln. Thus, solar collectors 141 are positioned to provide heat only on one side of kiln. The heat exchange surfaces 143 of solar collectors 141 are generally positioned so that the circulation entry point 140A is lower than circulation exit point 140B, to take advantage of the natural direction of air circulation.

To still further encourage the circulation of the air 101, kiln 100 may be equipped with one or more fans 162 which may be powered by any suitable energy source. Most conveniently, fans 162 are powered by one or more photo-voltaic cells 165 which convert solar energy into electricity. The fans 162 are positioned to encourage air flow past heat exchange surfaces 143 of solar collectors 141 in the natural direction of the air circulation.

Fans 162 are useful to initially start the circulation of air within chamber 120. Generally, once circulation is started, some circulation is maintained by the rising of the hot air and falling of cold air. However, it is preferred that fans 162 be utilized to maintain a faster rate of circulation.

Wood chamber 120 generally includes curvalinear surfaces to encourage the circulation of air within chamber 120. For example, wood chamber 120 includes curvalinear surfaces 120A, 120B, 120C and 120D. Most preferably, chamber 120 is "egg" shaped.

Wood chamber 120 may also include one or more directional air fins 125 to direct the circulating air toward wood stack 50 and back to inlet 140A. Preferably, air fins 125 direct portions of the circulating air 101 over the top, middle and bottom sections of wood stack 50.

The operating temperature in kiln 100 will depend upon the ambient temperature and amount and quality of sun striking solar panels 141. It is preferable to insulate kiln 100 to reduce energy losses. Generally, the operating temperature will range from about 90° F. to about 120° F., preferably in the range of about 95° F. to about 115° F., more preferably in the range of about 105° F. to about 110° F.

One or more drains 128 may be positioned in the floor of kiln 100 to allow for drainage of liquid.

To provide for ease of transporting kiln 100, support carriage may optionally be provided with wheels 182, which allow it to be pushed, towed or self-powered from site to site.

Kiln 100 may also be utilized during the transport of lumber to provide for drying during transportation. For example, kiln 100 may be utilized onboard ships during transoceanic shipping.

While the present invention has been illustrated mainly with reference to the drying of lumber, the present invention may be utilized in the drying of other products. Non-limiting examples of other products which may be dried include fruits, flowers and grains.

The present invention may also be utilized not only to dry, but to heat. As non-limiting examples, the present invention may be utilized to heat pickle brine in a pickling process, to provide heat to the water and interior of a hydroponic garden, or to heat buildings.

EXAMPLE

The following example is provided merely to illustrate the emnbodiments of the present invention and is not intended to limit the scope of the claims in any manner.

Example 1

A kiln 100 was constructed basically as illustrated in FIG. 1, except as noted herein. Kiln 100 is equipped with photo-voltaic cell 165 placed on top of the roof. Photo-voltaic cell 165 transforms sunlight into electrical power provided by wires 163 to the two fans 162 located inside the outer two of the five parabolic-shaped solar heat collectors 141. A vane-type air flow sensing element 195 is utilized to calculate the air flow speed of air 101 circulating inside the kiln.

Figure 4:
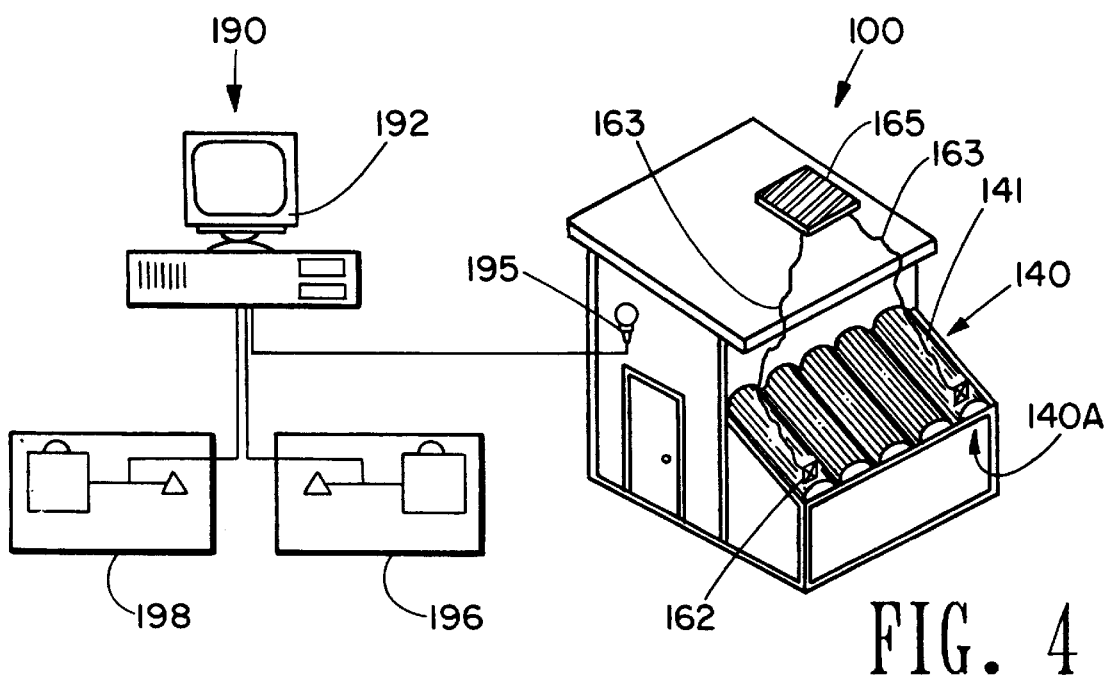
FIG. 4 is a schematic representation of the data gathering system utilized for collecting data in the Examples.

The monitoring system 190 also includes two Omega relative humidity and temperature transmitters 196 and 198—installed inside the kiln and one outside. FIG. 4 is a schematic of monitoring system 190 utilized. The sensors 196 and 198 transmit relative humidity and temperature directly to a computer 192. Readings are taken every six seconds and recorded every five minutes. Readings are saved on a floppy disk and then utilized to create weekly graphs that are valuable in computing drying time.

Moisture content in the wood each week is manually determined with a percent wood moisture meter having a range of 30 percent and as low as 6 percent. Determination can be made of the interaction of moisture and wood inside and outside conditions using these weekly readings combined with the weekly computer sensor readings.

For this example, the solar kiln 100 is constructed of standard 2"×4' studs that are 8' tall. The floor, due to the weight of 1,000 bd. ft. of raw lumber, required 2"×8" floor joists with a ¾" covering. Studs and joists were placed on 16" centers. The roof is corrugated tin that slopes 12" to the front. The slope allows water to run off while, at the same time, creating an inside air stream that flows up from end 140B of the collectors 141, and then down behind and through the lumber. The roof overhangs the structure by 24".

The collectors 141 were constructed of 2"×6" redwood with a covering of Kalwall. Kalwall was selected as it is specifically manufactured to eliminate unwanted rays while admitting the sun's wanted heat. The inside base of collectors 141 consists of Masonite covered with 16 gauge sheet metal which is painted black. There is a distance of 4" between the Kalwall and the sheet metal backing, which consisted of corrugated sheet metal to increase the heat transfer surface.

The bottom of 141 collectors has an opening 3" high and 14" long. The top end of each collector opens totally onto the roof line. The insulation is white Styrofoam 2" thick and 16" wide and fits between the 2"×4" studs and roof rafters.

Two wooden doors swing out on each side of the kiln 100 and close into standard door jams. 4'×8' sheets of T1–11 cedar siding serve as the outer skin. The total structure is built on two 6"×8" planks that act as a barrier between the ground and the floor joints. These are also incorporated into the design to act as slides in case we need to move the structure.

An estimate of 994 board feet was air dried to an average moisture reading of 10.5%. The kiln was loaded with both a front and back stack of oak boards. The 8.5 feet boards were 1 inch thick with random widths. Data was gathered over 28 days. The wood was acceptable for commercial use (less than 9% moisture) within 10 days. Moisture and temperature readings are provided in the following Tables 1 and 2, respectively, for both the front and back stacks for the top, 8th, 24th and bottom boards (counting from top).

TABLE 1

Moisture Data for Front/Back stacks

| Days from loading | Top | 8th | 24th | bottom |
|---|---|---|---|---|
| 9 | 5/5 | 8/6.5 | 8.5/7 | 8.5/7.5 |
| 14 | 5/5 | 6.5/5 | 8.5/5 | 8.5/6.75 |
| 20 | 5/5 | 5/5 | 7/5 | 7.5/6.25 |
| 28 | 5/5 | 5/5 | 5/5 | 5/5 |

TABLE 2

Temperature and Humidity Data for Front/Back stacks

| Days from loading | Time of day | $Temp_{IN}$ | $Temp_{OUT}$ | $Humidity_{IN}$ | $Humidity_{OUT}$ |
|---|---|---|---|---|---|
| 2 | 1:00 pm | 79 | 72 | 35 | 50 |
| 3 | 9:00 pm | 64 | 59 | 48 | 84 |
| 4 | 5:30 pm | 94 | 77 | 32 | 60 |
| 5 | 4:30 pm | 108 | 86 | 28 | 55 |
| 9 | 2:00 pm | 118 | 85 | 18 | 46 |
| 10 | 8:30 am | 71 | 67 | 41 | 88 |
| 11 | 4:30 pm | 108 | 83 | 24 | 52 |
| 12 | 5:00 pm | 110 | 82 | 23 | 57 |
| 15 | 3:45 pm | 108 | 81 | 16 | 44 |
| 16 | 3:00 pm | 108 | 79 | 15 | 47 |
| 17 | 6:00 pm | 108 | 85 | 24 | 54 |
| 18 | 4:45 pm | 116 | 91 | 20 | 51 |
| 19 | 5:00 pm | 117 | 95 | 20 | 44 |
| 22 | 2:30 pm | 108 | 75 | 10 | 35 |
| 23 | 1:55 pm | 108 | 83 | 11 | 38 |
| 24 | 5:00 pm | 114 | 87 | 15 | 41 |
| 25 | 5:45 pm | 104 | 80 | 16 | 43 |
| 26 | 7:00 pm | 99 | 76 | 20 | 56 |
| 27 | 4:20 pm | 105 | 84 | 21 | 59 |
| 28 | 5:00 pm | 96 | 65 | 15 | 33 |
| 31 | 5:30 pm | 98 | 62 | 19 | 44 |
| 32 | 4:30 pm | 103 | 75 | 12 | 29 |
| 33 | 5:00 pm | 81 | 64 | 20 | 61 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A drying apparatus comprising:
    (a) a frame defining a chamber suitable for holding an item to be dried, said chamber comprising curvalinear surfaces for facilitating air circulation, and further comprising a warm end with a heat transfer surface and a cool end;
    (b) a heater positioned to provide heat to the heat transfer surface;
    (c) a fan positioned to provide air flow across the heat transfer surface; and
    (d) a baffle positioned at the cool end to receive air flow from the heat transfer surface and direct it toward the warm end.

2. The apparatus of claim 1 wherein the heater comprises a solar collector.

3. The apparatus of claim 2 wherein the solar collector is a parabolic-shaped solar collector.

4. The apparatus of claim 1 wherein the fan is powered by a photo voltaic cell.

* * * * *